United States Patent

Demido

[11] 4,278,009
[45] Jul. 14, 1981

[54] HYDRAULIC BRAKE BOOSTER

[75] Inventor: Michael Demido, Troy, Ohio

[73] Assignee: General Motors Corporation, Detroit, Mich.

[21] Appl. No.: 68,896

[22] Filed: Aug. 23, 1979

[51] Int. Cl.³ .................. F15B 13/14; F15B 13/10
[52] U.S. Cl. .............................. 91/47; 91/391 R; 91/431; 91/434
[58] Field of Search ............... 91/431, 434, 47, 391 R

[56] References Cited

U.S. PATENT DOCUMENTS

| 3,093,119 | 6/1963 | Stolzer | 91/434 |
| 3,148,592 | 9/1964 | Schultz et al. | 91/431 |
| 3,699,680 | 10/1972 | Shellhouse | 91/431 |
| 4,181,064 | 1/1980 | Flory | 91/431 |

FOREIGN PATENT DOCUMENTS 1576148  6/1969  Fed. Rep. of Germany ............ 91/431

Primary Examiner—Paul E. Maslousky
Attorney, Agent, or Firm—D. D. McGraw

[57] ABSTRACT

The booster is installed downstream of a vehicle's power steering gear. The booster has a power piston and a valve seat piston assembly reciprocably mounted in a bore of the booster housing. The valve seat piston assembly includes two nested control pistons separated by a rubber cushion member which permits limited relative control piston movements. Hydraulic inlet pressure is introduced into the housing bore between these pistons and flows through a normally open poppet valve, which acts as a booster control valve. Movement of the booster input push rod restricts hydraulic fluid flow through the control valve and causes pressure to be built up in the power chamber between the power piston and the valve seat piston assembly. The pressure acts on the power piston to move the booster output member. The pressure also holds one of the control pistons of the valve seat piston assembly in position against the bore end wall so that it does not move during normal power boost operation. The other control piston, on which the control valve seat is formed, moves to compress the cushion member as apply force is increased. The reaction travel obtained gives brake pedal travel characteristics nearly matching those of current vacuum power boosters. In the power mode brake pedal travel can be very low, permitting a high brake pedal ratio for the no-power operating mode.

2 Claims, 2 Drawing Figures

HYDRAULIC BRAKE BOOSTER

The invention relates to a hydraulic brake booster for operating a master cylinder assembly in a brake system. It more particularly relates to such a booster which operates with a small amount of brake pedal travel during power boost operation, and is capable of having a high brake pedal ratio so that manual actuation of the master cylinder assembly by pushing through the booster can be accomplished without requiring extremely heavy brake pedal force loads. The booster has a cushion member in the control valve assembly which is compressed as apply force is increased, permitting reaction travel which gives the booster pedal travel feel characteristics similar to current production vacuum power boosters. This provides good brake pedal feel without a loss of pedal travel for manual apply.

Hydraulic brake boosters have been used for some years which have a valve seat forming a part of the control valve provided on the power piston or moving with that piston. The disclosure of U.S. Pat. No. 3,699,680—Shellhause is an example of this type of brake booster. Such a booster requires controlling movement of the brake pedal which is directly related to the amount of booster output member movement. Other boosters have been used which have a lever mechanism permitting the controls to move a proportionally smaller distance than the power piston during normal power operation, but yielding so that the control moves during manual operation at a distance substantially equal to that traveled by the piston. Such boosters are exemplified by a U.S. Pat. No. 3,603,209—MacDuff and U.S. Pat. No. 3,625,112—Brown. Variable ratio brake pedal linkages are also well known, as exemplified by U.S. Pat. No. 3,858,457—Mathues; U.S. Pat. No. 3,911,760—Elbers et al; and U.S. Pat. No. 4,069,722—Derrick. These linkages typically modify the effective ratio of the brake pedal lever during its stroke from a brake release position to a full brake apply position. Other brake mechanisms have been proposed which utilize a zero or minimum travel brake pedal which is relatively low to the floor of the vehicle for power booster operation, and which have some type of device which raises the brake pedal to a higher level so that additional brake pedal travel is available for manual brake operation when power is no longer available. Examples of such brake booster mechanisms are illustrated in U.S. Pat. Nos. 3,093,120—Ayres, Jr.; 3,246,473—McCotter et al; 3,250,183—Gephart; and 3,250,184—DeHoff.

The mechanism to which the invention is most closely related is disclosed and claimed in U.S. Pat. application Ser. No. 68,895 entitled, "Hydraulic Brake Booster", filed by Arthur R. Shaw on Aug. 23, 1979 and assigned to the common assignee. That booster has many of the advantages of a variable ratio mechanism as well as the zero brake pedal travel mechanism but is much simpler in concept and operation. It requires only nominal movement of the brake pedal during operation of the master cylinder assembly, and requires only slight movement to afford a complete closure of the control valve mechanism to thereafter provide a manual force transmitting path through the booster mechanism for manual operation of the master cylinder. Manual operation can occur either when there is no power pressure available at all, or can also occur when power runout has occurred and additional actuating force on the master cylinder is required by the vehicle operator. In the latter situation, closure of the control valve operates to establish the pressurized hydraulic fluid in the power chamber as a hydraulic link through which additional manually induced brake master cylinder operational force is transmitted.

The mechanism embodying the invention herein disclosed and claimed includes a valve piston assembly which is composed of a valve housing portion and a valve seat portion formed as nested control pistons. These portions are separated by a rubber cushion member which permits limited relative movements of the nested pistons. The valve seat portion moves to compress the cushion member as apply force is increased. This permits reaction travel which gives brake pedal feel characteristics similar to those of current production vacuum power boosters. Stops are provided so that the valve piston assembly portions have a limit to the relative movement obtained with increased apply force. The valve seat portion has a net effective area exposed to power pressure so that the power pressure urges the valve seat portion in the direction tending to compress the cushion member. The stops prevent further movement of the valve seat portion relative to the valve housing portion at a predetermined power pressure controlled by the yield characteristic of the cushion member.

IN THE DRAWING

Figure 1:
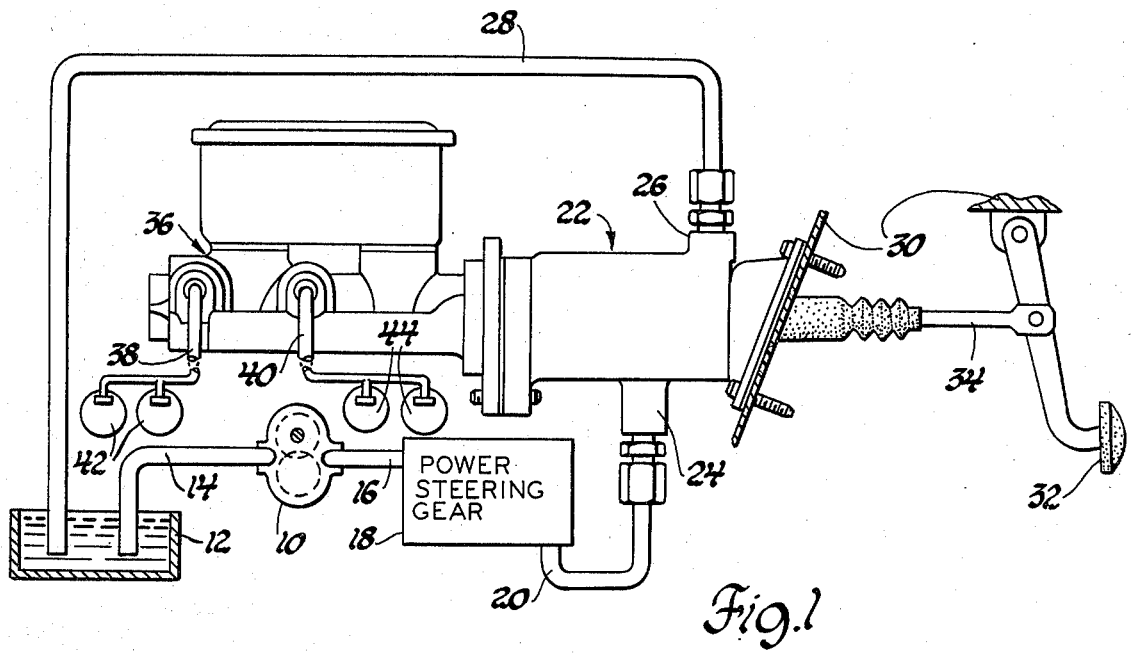
FIG. 1 is a schematic illustration of a hydraulic brake booster and power steering gear system with parts broken away and in section.

The system of FIG. 1 is schematically illustrated as including a power steering pump 10 which receives hydraulic fluid from a reservoir 12 through conduit or passage 14 and delivers the hydraulic fluid through conduit 16 to the power steering gear 18. Gear 18 is of the well known open center type so that the hydraulic fluid flows through the gear without any substantial restriction when the gear is not operating. The fluid then passes through conduit 20 to the hydraulic brake booster 22. Conduit 20 is connected to the booster inlet 24 for this purpose. Booster outlet 26 delivers hydraulic fluid from the booster through conduit 28, which returns it to the reservoir 12. The reservoir 12 may be a physical part of the power steering pump 10, as is common practice.

The booster 22 is mounted on a suitable fixed portion 30 of the vehicle in which it is installed, as is the brake pedal 32. The brake pedal is connected to actuate the booster input push rod 34 in the usual manner. The output of the booster 22 is connected to the master cylinder assembly 36, which when actuated pressurizes hydraulic brake fluid in brake circuits 38 and 40. Circuit 38 is schematically illustrated as including the vehicle front wheel brakes 42, and circuit 40 is schematically illustrated as including the vehicle rear brakes 44. Other split circuit arrangements may also be used.

Figure 2:
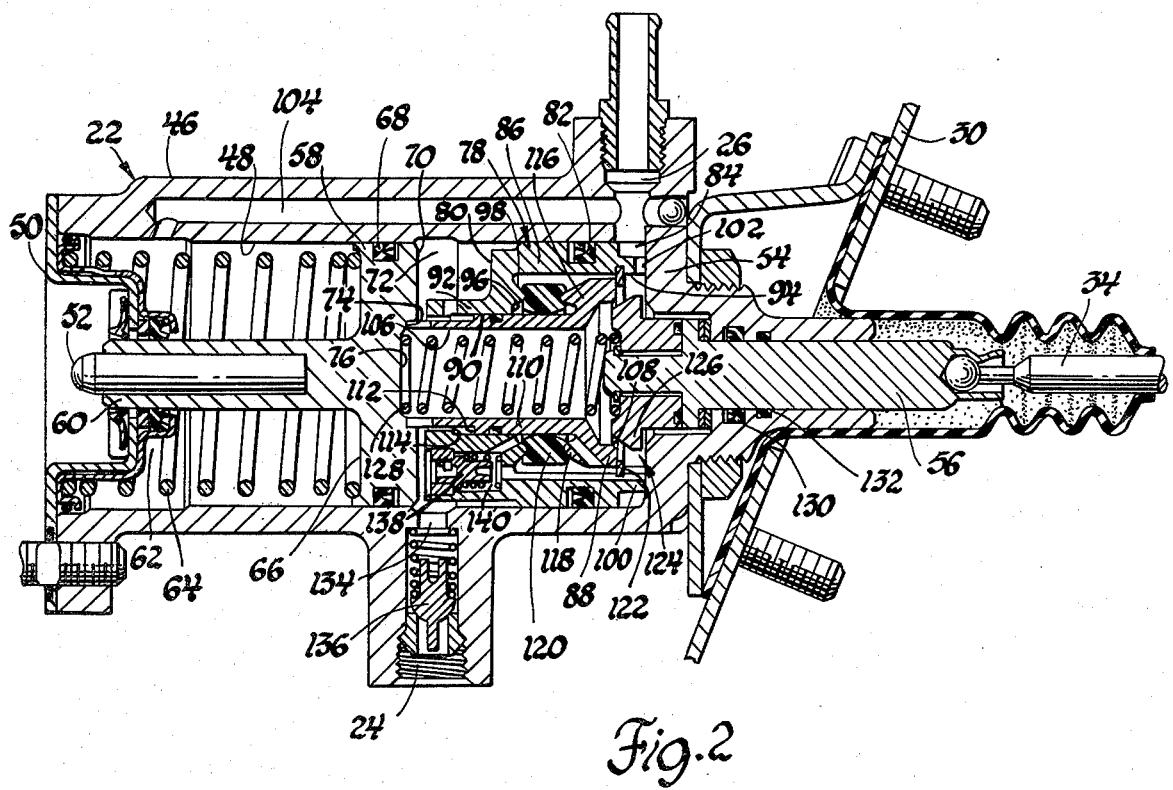
FIG. 2 is a cross-section view of the hydraulic brake booster of FIG. 1 and illustrates the brake booster embodying the invention.

The hydraulic brake booster 22 embodying the invention is illustrated in detail in FIG. 2. It includes a housing 46 having a bore 48 formed therein. The front portion of bore 48 is closed by an end cover 50 through which the booster output member 52 extends. The after end of bore 48 is formed with an end wall 54 through which the booster input member 56 sealingly and reciprocably extends. Input member 56 is suitably connected with the push rod 34 so as to be moved under control of the vehicle operator by operation of the brake pedal 32. A power wall 58, formed as a power piston, is reciprocably received in bore 48. The power wall 58 has a forwardly extending portion 60 which extends through the end cover 50 in sealing and reciprocal relationship. The booster output member 52 is received by and extends from portion 60. Output member 52 is operatively connected to a pressurizing piston in the master cylinder assembly 36, as is well known in the art. On the forward side of power wall 58 is a chamber 62 containing the power wall return spring 64. Spring 64 has one end acting on the forward face 66 of the power wall 58 and the other end acting on end cover 50. Spring 64 continually urges the power wall 58 rearwardly to the released position. A seal 68 on the outer periphery of the power wall 58 seals the power wall relative to the surface of bore 48 so that any pressure in the power chamber 72 will not leak into chamber 62. The rear face 70 of the power wall 58 forms the forward wall of the power chamber 72. The center portion of power wall rear face 70 is slightly recessed to provide a first abutment surface 74 and a second abutment surface 76.

A valve piston assembly 78 is reciprocably received in bore 48 intermediate power wall 58 and the bore end wall 54. The forward face 80 of valve piston assembly 78 forms the rear wall of the power chamber 72. A seal 82 on the outer periphery of valve piston assembly 78 seals the piston relative to the surface of bore 48 so that any pressure in power chamber 72 will not leak into exhaust chamber 84.

The valve piston assembly 78 includes a valve housing portion 86 and a valve seat portion 88. These portions are formed to provide nested control pistons. Valve housing portion 86 has face 80, seal 82, and a bore 90. The forward extension 92 of portion 86 defines a smaller diameter portion of bore 90. A larger diameter portion 94 of that bore is defined by the rear part of portion 86. The shoulder 96 between the different diameter bore portions includes an annular abutment 98. The rear end 100 of portion 86 engages end wall 54 when the booster is inactive or power operating, and has cutout portions 102. The exhaust chamber 84 is defined by end wall 54 and the rear side of assembly 78. It is fluid connected to booster outlet 26. A passage 104 in the housing 46 connects chamber 62 with outlet 26.

The valve seat portion 88 of assembly 78 has a bore 106 formed therethrough, with the forward bore end opening into power chamber 72 and the rear bore end opening through annular valve seat 108 into exhaust chamber 84. Portion 88 is reciprocably received in bore 90, and the forward part 110 is sealingly supported in the forward extension 92 of portion 86. A shoulder 112 formed on the forward part 110 cooperates with a stop 114, provided at the forward end of bore 90, to limit the movement toward power wall 58 of portion 88 relative to portion 86.

The rear part 116 of portion 88 is radially enlarged and contained within bore section 94 in radially spaced relation. Rear part 116 has an annular abutment 118 facing forwardly and in alignment with annular abutment 98. Annular cushion member 120 is mounted on portion 88 with one side engaging abutment 118 and the other side engaging abutment 98. Cushion member 120 is made of a rubber or rubber-like material having yield characteristics which control the deformation of the cushion member as valve seat portion 88 moves relative to valve housing portion 86, transmitting compression force through the cushion member. A stop 122, formed by a snap ring fitted in the rear end of bore portion 94, retains portion 86 within portion 88 and limits the relative movement of these portions when cushion member 120 is permitted to expand upon reduction of booster apply force.

The valve seat 108 is of greater diameter than the forward part 110 of portion 88. Therefore there is a net effective area on portion 88 exposed to power chamber pressure so that portion 88 is urged by power pressure toward power wall 58, generating a force compressing cushion member 120. The power pressure acts on a net effective area of portion 86 to urge that portion toward end wall 54, and normally holds portion 86 in engagement with that end wall.

The control valve 124 includes the valve seat 108 and a valve element 126 secured to or formed as a part of the input member 56. Input member 56 extends through the exhaust chamber 84 and supports valve element 126 in valving relation with valve seat 108 to define the control valve 124 as an annular poppet valve controlling hydraulic fluid flow from power chamber 72 through bore 106 to the exhaust chamber 84. A spring 128 within bore 106 has its rear end acting on the valve element 126 to continually urge that element and input member 56 rearwardly. The forward end of spring 128 engages the abutment surface 76 of power wall 58. Suitable seals 130 and 132 in the rearward reduced diameter portion of bore 48 cooperate with the outer surface of input member 56 to prevent loss of hydraulic fluid from exhaust chamber 84 through the rear portion of the bore.

The brake booster inlet 24 communicates through a port 134 with the power chamber 72 through a check valve 136. Check valve 136 is arranged to open under very light hydraulic pressure so as to provide no substantial resistance to hydraulic flow. However, the check valve will close whenever the pressure in the power chamber 72 is substantially equal to or greater than the pressure being received from the power steering pump 10 through conduit 20 and inlet 24. A pressure limiting check valve 138 is positioned in a passage 140 formed through the valve housing portion 86 and is normally closed. Valve 138 is so positioned and arranged that it opens to limit to a predetermined desired maximum the pressure that can be introduced into power chamber 72 relative to the pressure in exhaust chamber 84. When the hydraulic pressure in chamber 72 exceeds the predetermined desired maximum value, valve 138 opens and bleeds off the pressure through passage 140 to the exhaust chamber 84 until the excess pressure no longer exists in the power chamber 72.

When the booster is in the released position and the power steering pump 10 is operating, hydraulic fluid is pumped with little pressure loss through the power steering gear 18 and the booster 22. When the vehicle operator operates the brake pedal 32 to actuate the vehicle brakes, slight movement of the brake pedal results in slight forward movement of push rod 34 and input member 56 so that valve element 126 approaches valve seat 108 and restricts or closes the control valve 124. This immediately causes a build-up of hydraulic pressure in power chamber 72, which acts on the forward face 80 of valve housing portion 86 and tends to hold the valve piston assembly 78 in the rearward position illustrated with the rear end of portion 86 in engagement with bore rear end wall 54. The pressure also acts on the rear face 70 of the power wall 58, moving the power wall and therefore output member 52 forwardly against the force of piston return spring 64 to actuate the master cylinder assembly 36. The pressure also acts across the area of the forward end of input member 56 and valve element 126 to provide reaction to the vehicle operator. As power wall 58 moves forwardly, the forward end of forward part 110 is separated from the abutment surface 74 of the power wall since the valve assembly 78 remains in its rearward position. Thus the vehicle operator can control the amount of boost operation by controlling the amount of restriction established by control valve 124. This is done with axial forward movement of valve element 102 and input member 56. The power pressure acts on portion 88, moving it forward, toward the power wall 58, relative to portion 86, compressing cushion member 120. Thus somewhat more axial forward movement of valve element 126 and input member 56 is obtained than is obtained in the device of U.S. Pat. application Ser. No. 68,895 referred to above. This gives brake pedal feel characteristics to the operator which are similar to current production vacuum power boosters. The operator may feel more comfortable with such characteristics, particularly when driving different vehicles with different brake boosters.

If more master cylinder operational force is required than can be generated by the maximum determined pressure in power chamber 72, the vehicle operator only needs to move brake pedal 32 sufficiently to engage valve element 126 with valve seat 108. This will completely close control valve 124 and will trap hydraulic fluid in the power chamber 72 at no more than the predetermined maximum pressure value. Further operation of the brake pedal in a brake applying direction will cause the manual force to be transmitted from input member 56 and valve element 126 to portion 88, moving shoulder 112 into engagement with stop 114. At booster runout with normal power pressure available, shoulder 112 would have engaged stop 114 without such further manual movement. Portion 88 then acts on portion 86, and assembly 78 acts on the hydraulic link established by the trapped pressure in power chamber 72 to move power wall 58 forwardly to the same extent. This causes the booster output member 52 to move an additional amount equal to the amount of movement of the input member 56. The brake pedal 32 may be provided with a relatively high pedal ratio so that this movement can occur without high brake pedal force required to be exerted by the vehicle operator.

The embodiments of the invention in which an exclusive property or privilege is claimed are defined as follows:

1. In a hydraulic booster having a power chamber defined by a movable power wall on one chamber side and movable valve piston means on the other chamber side,
    an output member moved by said power wall,
    an exhaust chamber defined by said movable valve piston means and a fixed wall, a hydraulic fluid inlet opening into said power chamber for introducing hydraulic power fluid therein, and a hydraulic fluid outlet opening from said exhaust chamber to conduct hydraulic power fluid therefrom,
    a control valve downstream of said hydraulic fluid inlet and upstream of said hydraulic fluid outlet, said control valve including a valve seat on said valve piston means and a valve control member movable in said exhaust chamber and cooperating with the valve seat to control hydraulic fluid flow from said power chamber to said exhaust chamber, and an input member mounting said valve control member and movable to control booster operation, the improvement comprising:
said valve piston means including a valve seat portion and a valve housing portion, said valve seat portion being sealingly and reciprocably received in said valve housing portion for movement relative thereto in directions toward and away from said power wall and said input member, first and second stop means on said valve housing portion respectively limiting movement of said valve seat portion relative to said valve housing portion toward said input member and toward said power wall, and a compression force transmitting cushion member positioned in force transmitting relation between said valve housing portion and said valve seat portion and yieldably permitting movement of said valve seat portion relative to said valve housing portion in the direction towards said power wall during booster hydraulic power operation in accordance with the amount of booster power pressure in said power chamber, said valve seat portion having a net effective area exposed to power pressure in said power chamber so that the power pressure urges the valve seat portion toward said power wall, said second stop means being engaged by and stopping movement of said valve seat portion relative to said valve housing portion at a predetermined power pressure in said power chamber controlled by the yield characteristic of said cushion member.

2. A hydraulic power brake booster comprising:
a housing having a bore therein;
a power wall having a booster output member, said power wall being reciprocably received in said housing bore;
a valve piston assembly having a housing portion and a seat portion, said assembly being reciprocably received in said housing bore and defining a power pressure chamber in combination with said power wall and a part of said housing, said valve piston assembly also defining an exhaust chamber on the opposite side thereof from said power pressure chamber in combination with another part of said housing;
an input member extending through said exhaust chamber in axial alignment with said valve piston assembly and said power piston;
a control valve defined by an annular valve seat on said valve piston assembly seat portion and a movable valve element on said input member and including a passage in said valve piston assembly seat portion passing through said annular valve seat, said passage providing fluid communication between said power and exhaust chambers as controlled by said control valve;
a compressively yieldable cushion member between said housing portion and said seat portion and permitting movement of said seat portion relative to said housing portion, said seat portion having a net effective area acted on by pressure in said power chamber to generate a force in accordance with booster power pressure tending to compress said cushion member;

a hydraulic fluid inlet in said housing for delivering hydraulic fluid to said power chamber upstream of said control valve and having a check valve therein for preventing fluid flow from said power chamber through said inlet, and a hydraulic fluid outlet positioned in said housing downstream of said control valve for receiving hydraulic fluid from said exhaust chamber;

said booster being power actuated by movement of said input member to restrict hydraulic fluid flow through said control valve and cause power pressure to increase in said power pressure chamber, said power pressure moving said power wall and holding said valve piston assembly housing portion against movement in the same direction as said power wall and moving said valve piston assembly seat portion to compress said cushion member to require a controlled amount of input member movement to control said booster throughout its power range;

said booster being subject to manual push-through operation by movement of said input member which is sufficient to engage said movable valve element with said annular valve seat and thereafter move said valve piston assembly and said power wall concurrently to move said output member as said input member is moved.

* * * * *

UNITED STATES PATENT AND TRADEMARK OFFICE
CERTIFICATE OF CORRECTION

PATENT NO. : 4,278,009
DATED : July 14, 1981
INVENTOR(S) : Michael Demido

It is certified that error appears in the above—identified patent and that said Letters Patent is hereby corrected as shown below:

Column 1, line 60, before "operation" insert -- booster --.

Signed and Sealed this

Seventeenth Day of November 1981

[SEAL]

Attest:

GERALD J. MOSSINGHOFF

Attesting Officer     Commissioner of Patents and Trademarks